UNITED STATES PATENT OFFICE 2,356,153

β-SUBSTITUTED-Δ$^{\alpha,\beta}$-γ-BUTYROLACTONES AND METHODS OF PREPARING THEM

Robert C. Elderfield, Hastings on Hudson, N. Y., and Martin Rubin, Baltimore, Md., assignors to Eli Lilly and Company, Indianapolis, Ind., a corporation of Indiana No Drawing. Application March 21, 1941,
Serial No. 384,587

7 Claims. (Cl. 260—344)

This invention relates to β-substituted-Δ$^{\alpha,\beta}$-γ-butyrolactones and to the methods of preparing them.

The compositions of this invention are represented by the following formula:

(1) 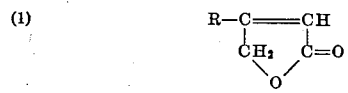

in which R is an aryl group—that is, a univalent aromatic hydrocarbon radical whose free valence belongs to a benzene-ring nucleus, and not to a side chain—such as phenyl, naphthyl, phenanthrenyl, or anthracyl. Such an aryl group is derived from an aromatic compound capable of reacting with magnesium to form a Grignard's reagent. A Grignard's reagent is any one of a group of organic magnesium compounds of the general type $R_3$—Mg—Y in which $R_3$ is an organic radical and Y is a halogen selected from the class consisting of chlorine, bromine, and iodine. The aromatic group may contain one or more substituents such as hydroxyl, alkyl, alkenyl and alkoxy. Sometimes it is necessary to protect the substituent group in order to form the required Grignard's reagent. The compound of the protected group forms with magnesium the required Grignard's reagent.

The compositions of this invention are prepared by reacting a compound represented by the formula:

(2) $\qquad$ R—Mg—X in which R has the same meaning as before and X is a halogen of the class consisting of chlorine, bromine, and iodine, to the action of an alkoxy-acetonitrile. This action may be represented by the following equation:

(3) $RMgX + R_1OCH_2CN \longrightarrow $ 

in which $R_1$ is an alkyl radical, preferably the methyl or ethyl radical. The reaction is preferably carried out in the presence of an ether or of a tertiary amine. The reaction product is treated with an aqueous solution of a mineral acid and separated from inorganic constituents to form an ω-alkoxymethyl ketone. This reaction may be represented by the following equation:

(4) 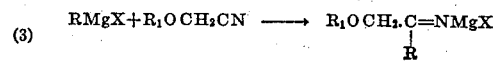

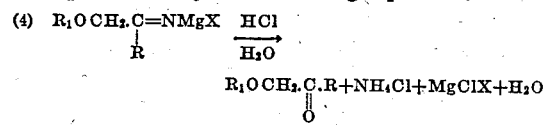

The ω-alkoxymethyl ketone is reacted with an ester of a haloacetic acid selected from the class which consists of chloroacetic acid, bromoacetic acid, and iodoacetic acid ($ZCH_2 \cdot COOR_2$ in which $R_2$ represents an alkyl radical, preferably the methyl or ethyl radical, and Z represents chlorine, bromine, or iodine) in the presence of zinc in an inert solvent, such as benzene or toluene. Preferably, this mixture is refluxed and the reaction product is treated with an aqueous solution of a mineral acid, such as hydrochloric acid, which is cooled to approximately 0° C., and separated from inorganic constituents to form an ester of β-R-β-hydroxy-β-alkoxymethyl propionic acid. The action which takes place is represented by the following equation:

(5) 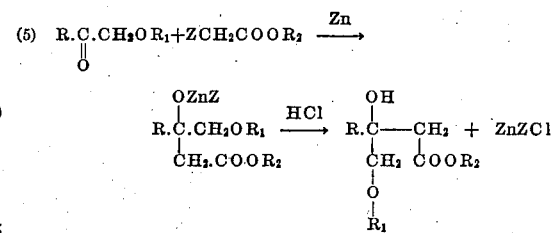

After cooling and decomposition of the zinc compound by the ice-cold dilute mineral acid, such as hydrochloric acid, the ester is separated and dried. The ester is then hydrolyzed by refluxing it with a solution of a base, such as sodium hydroxide. The corresponding salt of the β-R-β-hydroxy-β-alkoxymethyl propionic acid thus formed is converted to the free acid by acidification with a suitable mineral acid, such as sulfuric acid. The action which takes place is represented by the following equation:

(6) 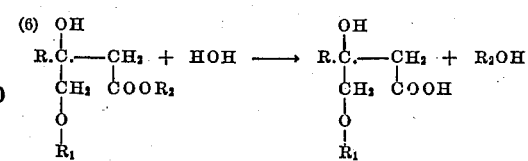

For substantially complete isolation of the β-R-β-hydroxy-β-alkoxymethyl propionic acid, the β-R-β-hydroxy-β-alkoxymethyl propionic acid is preferably extracted with ether from the reaction mixture. The ether may then be removed by distillation to yield the desired product.

The β-R-β-hydroxy-β-alkoxymethyl propionic acid or the ester of the acid is heated, preferably between 160° C. and 180° C. for a period of about one hour in the presence of an acid dehydrating agent selected from the class which consists of acid sulfates of the alkali metals, such as potassium acid sulfate or sodium acid sulfate, anhydrous oxalic acid and the monoalkaline salts of phosphoric acid, such as monosodium phosphate.

The action which takes place may be represented by the following equation:

(7) 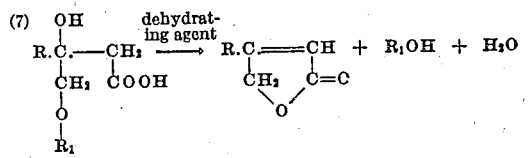

Typical examples of the compositions of this invention and the methods of preparing them are as follows:

EXAMPLE 1.—*Preparation of β-phenyl-Δ$^{α,β}$-γ-butyrolactone*

To a mixture of 50.1 of ω-methoxymethyl-phenyl ketone, 21.8 g. of granulated zinc and 250 cc. of dry benzene in a flask, provided with an efficient reflux condenser, are added 55.7 g. of freshly distilled ethyl bromoacetate. On gentle warming a vigorous exothermic reaction results, during which time the zinc compound of ethyl β-phenyl-β-hydroxy-β-methoxymethyl propionate is formed. After this reaction moderates, the mixture is refluxed for approximately two hours. When cooled, the organozinc compound is decomposed with ice-cold dilute sulfuric acid. The benzene layer, which contains the ethyl β-phenyl-β-hydroxy-β-methoxymethyl propionate is separated and dried with anhydrous sodium sulfate. The benzene solution is then evaporated and the resulting oil is distilled. The ethyl β-phenyl-β-hydroxy-β-methoxymethyl propionate boils at about 112° C., corrected, at 2 mm.

The reaction which takes place may be represented by the following equation:

(8) 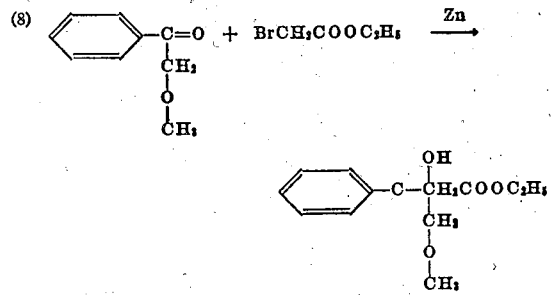

This ester is saponified by boiling with a 5 percent solution of sodium hydroxide in 50 percent alcohol for about one hour. The solution is then cooled to room temperature and acidified with a mineral acid, such as hydrochloric acid. The free acid, which is β-phenyl-β-hydroxy-β-methoxymethyl propionic acid, is extracted with ether and slowly crystallizes after removal of the solvent. Preferably, it is recrystallized from petroleum ether. It melts at about 60° C., corrected.

10 g. of this acid are heated in a Claisen flask with 5 g. of freshly fused potassium bisulfate for 30 minutes at 180° to 200° C., during which time the β-phenyl-Δ$^{α,β}$-γ-butyrolactone is formed. The cool, dark brown mass is thoroughly extracted with ether and the combined ether extracts are filtered from the inorganic salts. The residue after removal of the ether is distilled at reduced pressure. The lactone distills as a rapidly crystallizing oil which boils at 155° C., corrected, at 2 mm. pressure. This is the desired β-phenyl-Δ$^{α,β}$-γ-butyrolactone. After recrystallization from water, the material melts at about 94° C., corrected. It gives no depression in melting point when mixed with a lactone prepared in accordance with the method disclosed in the copending application of Elderfield and Rubin Serial No. 384,586, filed March 21, 1941. The β-phenyl-Δ$^{α,β}$-γ-butyrolactone may be represented by the following formula:

(9) 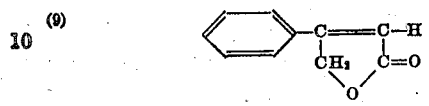

EXAMPLE 2.—*Preparation of β-(p-hydroxyphenyl)-Δ$^{α,β}$-γ-butyrolactone*

A solution of 35 g. of ethyl bromoacetate in 25 cc. of dry benzene is added drop-wise to a boiling mixture of 38 g. of p-methoxyphenyl-ω-methoxymethyl ketone, 20.9 g. of granulated zinc and 175 cc. of dry benzene in a flask equipped with a reflux condenser and stirrer. Preferably, the solution of ethyl bromoacetate is added during the course of about an hour with constant stirring, and the mixture is then refluxed for 3 hours longer. The reaction mixture which contains the desired zinc complex is treated with dilute hydrochloric acid and the benzene layer is separated and dried with sodium sulfate. During this time the desired ethyl β-(p-methoxyphenyl)-β-methoxymethyl propionate is formed. After removal of the benzene, the product is distilled at reduced pressure. It boils at about 152° C. to 160° C., corrected, at 0.6 mm. pressure. An analysis reveals 62.9 percent carbon and 7.8 percent hydrogen which compares with theoretical values of 62.7 percent carbon and 7.5 percent hydrogen. The desired product may be represented by the following formula:

(10) 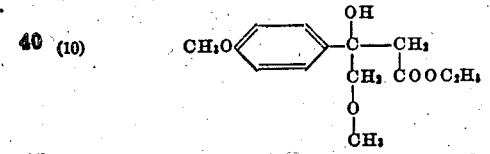

The ethyl β-(p-methoxyphenyl)-β-hydroxy-β-methoxymethyl propionate is treated with an alkaline solution exactly as in Example 1. During this time β-(p-methoxyphenyl)-β-hydroxy-β-methoxymethyl propionic acid is formed. An analysis reveals the presence of 60.0 percent carbon and 6.9 percent hydrogen which compares with theoretical values of 60.0 percent carbon and 6.7 percent hydrogen.

The β-(p-methoxyphenyl)-β-hydroxy-β-methoxymethyl propionic acid is heated with potassium bisulfate in the same manner as the analogous compound is treated in Example 1 to form β-(p-methoxyphenyl)-Δ$^{α,β}$-γ-butyrolactone. This latter compound is refluxed in a mixture of 3 parts of 48 percent aqueous hydrobromic acid and 2 parts of glacial acetic acid for about 3 hours. The desired β-(p-hydroxyphenyl)-Δ$^{α,β}$-γ-butyrolactone is formed during this time. The reaction mixture is poured into ice water and the desired lactone, which is substantially insoluble, is filtered off. The lactone may be recrystallized preferably from dilute alcohol or from water, and melts at about 245° C., corrected. This lactone is represented by the following formula:

(11) 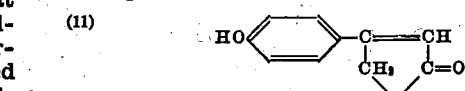

The lactone prepared by this method gives no depression in melting point when mixed with the β-(p-hydroxyphenyl)-Δ^{α,β}-γ-butyrolactone prepared by the method disclosed in the copending application of Elderfield and Rubin, Serial No. 384,586, filed March 21, 1941.

EXAMPLE 3

*Preparation of β-(β-naphthyl)-Δ^{α,β}-γ-butyrolactone*

β-Naphthyl methoxymethyl ketone is prepared in the same manner as the analogous compound described in Example 1, and the ketone is reacted with ethyl bromoacetate in the presence of zinc as described for the analogous compound in Example 1 to produce ethyl β-(β-naphthyl)-β-hydroxy-β-methoxymethyl propionate. This ester is heated with potassium bisulfate exactly as described in Example 1 to produce β-(β-naphthyl)-Δ^{α,β}-γ-lactone. The β-(β-naphthyl)-Δ^{α,β}-γ-butyrolactone is extracted with ether and the ether containing the lactone is dried with anhydrous sodium sulfate. The ether solution is evaporated to dryness and the residue, which consists of the desired lactone, is recrystallized from alcohol. This lactone is represented by the following formula:

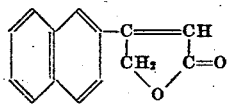

What is claimed is:

1. β-Substituted-Δ^{α,β}-γ-butyrolactone which is represented by the following formula:

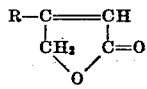

in which R is an aryl group.

2. β-Phenyl-Δ^{α,β}-γ-butyrolactone which is represented by the following formua:

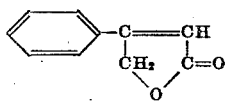

3. β-(β-Naphthyl)-Δ^{α,β}-γ-butyrolactone which is presented by the following formula:

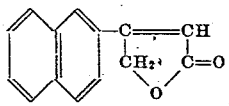

4. The process of preparing a β-substituted-Δ^{α,β}-γ-butyrolactone which comprises subjecting a compound represented by the following formula:

in which R is an aromatic group, and X is a halogen of the class which consists of chlorine, bromine, and iodine to the action of an alkoxyacetonitrile, treating the resulting product with an aqueous solution to form an ω-alkoxymethyl-R-ketone, reacting the said ω-alkoxymethyl-R-ketone with an ester of a haloacetic acid selected from the class which consists of chloroacetic acid, bromoacetic acid, and iodoacetic acid in the presence of zinc, treating the resulting product with an aqueous acid solution to form an ester of β-R-β-hydroxy-β-alkoxymethyl propionic acid, subjecting the said ester of β-R-β-hydroxy-β-alkoxymethyl propionic acid to the action of a base in a suitable solvent to form β-R-β-hydroxy-β-alkoxymethyl propionic acid and treating said β-R-β-hydroxy-β-alkoxymethyl propionic acid with a substance selected from the class which consists of acid sulfates of alkali metals, anhydrous oxalic acid, and monoalkaline salts of phosphoric acid.

5. The process of preparing a β-substituted-Δ^{α,β}-γ-butyrolactone which comprises subjecting a compound represented by the following formula:

in which R is an aromatic group, and X is a halogen of the class which consists of chlorine, bromine, and iodine to the action of an alkoxyacetonitrile, treating the resulting product with a dilute acid to form an ω-alkoxymethyl-R-ketone, reacting the said ω-alkoxymethyl-R-ketone with an ester of a haloacetic acid selected from the class which consists of chloroacetic acid, bromoacetic acid, and iodoacetic acid in the presence of zinc, treating the resulting product with an aqueous acid solution to form an ester of β-R-β-hydroxy-β-alkoxymethyl propionic acid, subjecting the said ester of β-R-β-hydroxy-β-alkoxymethyl propionic acid to the action of a base in a suitable solvent to form β-R-β-hydroxy-β-alkoxymethyl propionic acid and heating the said β-R-β-hydroxy-β-alkoxymethyl propionic acid in the presence of an acid sulfate of an alkali metal at a temperature between 160° C. and 180° C.

6. The process of preparing a β-substituted-Δ^{α,β}-γ-butyrolactone which comprises treating a member of the class which consists of β-R-β-hydroxy-β-alkoxymethyl propionic acids and derivatives of β-R-β-hydroxy-β-alkoxymethyl propionic acids, in which R represents an aromatic group, in the presence of a substance selected from the class which consists of acid sulfates of alkali metals, anhydrous oxalic acid and monoalkaline salts of phosphoric acid.

7. β-(p-Hydroxyphenyl)-Δ^{α,β}-γ-butyrolactone which is represented by the following formula:

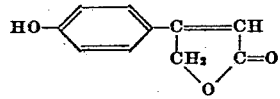

ROBERT C. ELDERFIELD.
MARTIN RUBIN.